United States Patent Office 3,426,053
Patented Feb. 4, 1969

3,426,053
DIFERROCENYL DERIVATIVES OF GROUP IV-A ELEMENTS
Harold Rosenberg, Dayton, Ohio, assignor to the United States of America as represented by the Secretary of the Air Force
No Drawing. Filed Aug. 31, 1966, Ser. No. 576,779
U.S. Cl. 260—429          9 Claims
Int. Cl. C07f 7/00, 15/02

ABSTRACT OF THE DISCLOSURE

Compounds of the structure

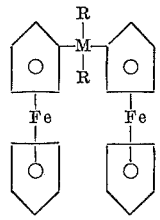

where M is an element selected from the group consisting of Si, Ge, Sn and Pb, and R is a radical selected from the group consisting of halide, alkyl and aryl radicals.

These compounds are thermo stable and useful in making polymers and copolymers which find application in coating, adhesive and lubricating compositions.

---

The invention described herein may be manufactured and used by or for the United States Government for governmental purposes without the payment to me of any royalty thereon.

This invention deals with ferrocene derivatives, compounds with coupled ferrocene nuclei, and ferrocene polymers and with methods for the preparation thereof. The invention, more specifically, deals with compounds comprising a nucleus wherein a ferrocene moiety is bound to a tetravalent element selected from the group consisting of silicon, germanium, tin, and lead.

Ferrocene is symbolized herein as

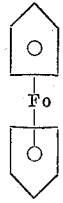

and the nucleus of interest herein is

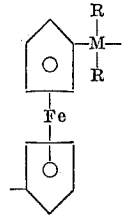

where M is the tetravalent element and R is a radical selected from the group consisting of aryl and alkyl radicals. Alternatively R may be a halide radical.

The ferrocene nucleus is characterized by a high thermal stability and good resistance to electromagnetic radiation, properties which suggest its use in materials to be used in high temperature environments or in environments where the material may be subjected to a significant amount of electromagnetic radiation. It is, of course, necessary that materials possessing these properties have other useful functions such as those of polymers, coating materials, adhesives, lubricants, and the like.

Objects

It is therefore an object of this invention to prepare novel derivatives of ferrocene.

It is a further object to prepare ferrocene derivatives which are useful as polymers, are useful intermediates in polymer formation, or are useful as adhesives, lubricants, coating materials, and the like.

It is a specific object of the invention to provide compounds having a nucleus wherein a ferrocene moiety is bound to a silicon, germanium, tin, or lead atom.

It is also a specific object of the invention to provide polymers wherein the repeating unit comprises said nucleus; that is, a nucleus wherein a ferrocene moiety is bound to a silicon, germanium, tin, or lead atom.

I have now found that the foregoing and related objects can be attained in the method of preparing an organometallic nucleus comprising a ferrocene moiety and, bonded thereto, an element selected from the group consisting of silicon, germanium, tin, and lead, said nucleus comprising the structure:

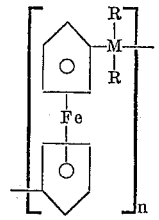

where M is said element, R is a radical selected from the group consisting of alkyl and aryl radicals, and $n$ is an integer greater than zero; wherein said method comprises the step of effecting the reaction of a lithioferrocene with a compound having the formula:

$$R_2MR'X$$

where X is a halide radical and R' is a radical selected from the group consisting of halide, alkyl, and aryl radicals. When R' is either an alkyl or an aryl radical, it is usually the same as R. In this latter instance the formula $R_2MR'X$ can be written $R_3MX$. When R' is a halide radical it is usually the same as X and the formula can be written $R_2MX_2$.

A first type of compound of specific interest herein has the structure:

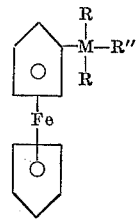

where M is silicon, germanium, tin, or lead, and R and R" are alkyl or aryl radicals. When R" is a ferrocenyl radical, we have a second type of compound of specific interest herein. It has the model structure:

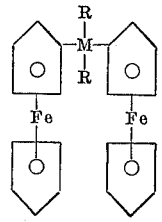

In both of the above types the integer $n$ in the nucleus described above is one. Where $n$ is more than one, we have a third type of compound of interest herein, a polymer of the model structure:

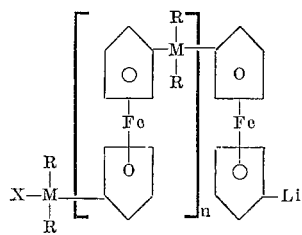

where X is a halide radical and the radical

replaces a hydrogen atom of ferrocene.

Compounds of the first type include, for example: ferrocenyltrimethylsilane, ferrocenyltriphenylsilane, and the corresponding compounds of germanium, tin, and lead. These compounds may be made by the reaction of monolithioferrocene with a compound having the formula $R_3MX$ as follows:

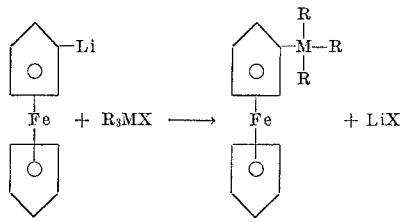

Compounds of the second type include, for example, diferrocenyldimethylstannane, diferrocenyldiphenylstannane, and the corresponding compounds of silicon, germanium, and lead. These compounds may be made by the reaction of monolithioferrocene with a compound having the formula $R_2MX_2$ as follows:

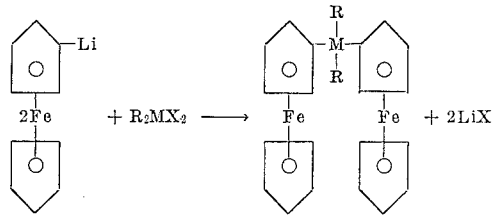

Alternatively the latter ferrocene derivatives can be made by preparing, first and by way of example, diferrocenyldichlorosilane and then reacting the latter with an alkyllithium as follows:

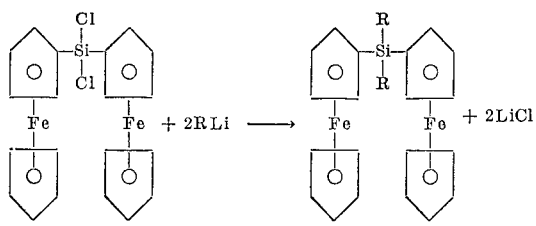

The compounds of the third type include, for example, polymers wherein the repeating unit is a ferrocenyldimethylsilane nucleus, a ferrocenyldiphenylsilane nucleus, or the corresponding nuclei wherein germanium, tin, or lead replaces the silicon atom. These polymers are made by the reaction of 1,1'-dilithioferrocene with a compound having the formula $R_2MX_2$ as follows:

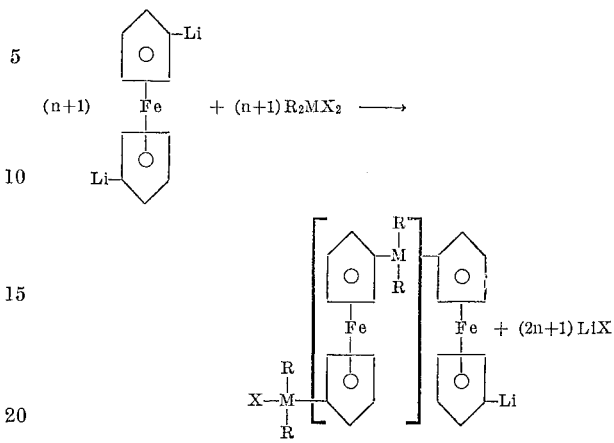

Mono- and dilithioferrocene are usually prepared by the reaction of ferrocene with an excess of n-butyllithium. The resulting mixture of the mono and di-substituted compounds has been, up to now, unseparable. Lithioferrocenes can also be prepared by reacting ferrocene with mercuric chloride, or mercuric acetate and lithium chloride, to form a mixture of monochloromercuriferrocene and 1,1'-bis(chloromercuri)ferrocene; separating the two mercury compounds from each other; and then reacting each of the separate chloromercuriferrocenes with n-butyllithium to form the separate monolithioferrocene and the 1,1'-dilithioferrocene. Attention is called to this process because it results in the presence of n-dibutylmercury as an impurity. n-Butylmercury is quite reactive in the chemical systems of interest herein and its presence minimizes the advantages to be obtained by use of the present invention.

As an alternative to the above, I prefer to separate the monochloromercuriferrocene and 1,1'-bis(chloromercuri)ferrocene fractions; replace the chloromercuri radicals with a bromide radical (reacting with N-bromosuccinimide, for example); separate out the bromo derivative; and then react with bromo derivative in tetrahydrofuran with an approximately stoichiometric proportion of n-butyllithium to generate the corresponding lithioferrocene. This latter method is the subject of my copending patent application Ser. No. 576,778, filed Aug. 31, 1966.

Example 1.—Synthesis of diferrocenyldimethylsilane.

Monolithioferrocene (0.033 mole) was prepared by the reaction of chloromercuriferrocene and n-butyllithium at 0° C. in a solvent consisting of 300 ml. of tetrahydrofuran (THF) and 69 ml. of hexane. The monolithioferrocene was not separated from the solvent. Dimethyldichlorosilane (0.015 mole) was added with stirring to the monolithioferrocene solution under dry nitrogen. The resulting mixture was stirred overnight at room temperature. Mercuric chloride (0.05 mole) dissolved in 20 ml. of tetrahydrofuran was then added with stirring to convert n-butylmercury to n-butylmercuric chloride. The mixture was poured into 700 ml. of water and the resulting mixture was extracted with petroleum ether. The petroleum ether extract was washed with water and dried over anhydrous magnesium sulfate. After filtration, evaporation of the solution gave 17.4 grams of an orange residue. Chromatography on neutral alumina gave 5.4 grams (0.010 mole) of diferrocenyldimethylsilane, a yield of 67 percent. The melting point of the product was 101°–101.5° C. The molecular weight was found to be 429, the theoretical molecular weight being 428.25. The analysis, in percent was found to be: carbon, 61.96; hydrogen, 6.00; iron, 26.33; and silicon, 5.79; the theoretical values are: carbon, 61.70; hydrogen, 5.66; iron, 26.08; and silicon, 6.56.

Example 2.—Synthesis of diferrocenyldiphenylsilane

Monolithioferrocene (0.065 mole) was prepared by the reaction of chloromercuriferrocene with n-butyllithium at −15° C. in a solvent consisting of 200 ml. of tetrahydrofuran and 136 ml. of hexane. The monolithioferrocene was not separated from the solvent. Diphenyldichlorosilane (0.029 mole) was added with stirring to the monolithioferrocene solution under an atmosphere of dry nitrogen. The resulting mixture was stirred overnight and then the solvents were evaporated off. The residue was extracted with petroleum ether to remove n-butylmercury, then with water to remove inorganic salts, then with methyl alcohol to remove any n-butylmercuric chloride, and finally with methylene dichloride. Chromatography of the residue from the evaporation of the methylene dichloride extract on neutral alumina yielded 9.8 grams of crude product. Further chromatography yielded 6.53 grams of diferrocenyldiphenylsilane, a yield of 42 percent. After recrystallization, the product had a melting point of 185.50–186° C. The molecular weight was found to be 519 whereas the theoretical molecular weight is 552.4. The analysis, in percent, was found to be: carbon, 69.54; hydrogen, 4.87; iron, 19.83; and silicon, 5.36; the theoretical values are carbon, 69.57; hydrogen, 5.12; iron, 20.22; and silicon, 5.08.

NMR (nuclear magnetic resonance) data for diferrocenyldiphenylsilane are given in Table 1.

Example 3.—Synthesis of ferrocenyltriphenylsilane

Monolithioferrocene was prepared by the reaction of bromoferrocene (0.025 mole) and n-butyllithium (0.027 mole) at −10° C. in a solvent consisting of 100 ml. of tetrahydrofuran and 17.5 ml. of hexane. The monolithioferrocene was not separated from the solvent. Triphenylchlorosilane (0.027 mole) was added with stirring to the monolithioferrocene solution under an atmosphere of dry nitrogen. The resulting mixture was stirred for about 3 hours and was then evaporated to dryness. The residue was dried in vacuo at room temperature to yield 14.67 grams of crude product. An aliquot of the residue (2.00 grams) was extracted with benzene. After drying over anhydrous magnesium sulfate, the benzene solution was chromatographed on neutral alumina. Elution with hexane gave 0.912 gram of ferrocenyltriphenylsilane, a yield of 60 percent based on the initial amount of bromoferrocene. After recrystallization, the melting point was 145–145.5° C. The molecular weight was found to be 434.1 whereas the theoretical molecular weight is 444.5. The analysis, in percent, was found to be: carbon, 75.89; hydrogen, 5.49; iron, 12.32; and silicon, 5.41; the calculated values are: carbon, 75.66; hydrogen, 5.45; iron, 12.56; and silicon, 6.32.

NMR data for ferrocenyltriphenylsilane are given in Table 2.

Example 4.—Synthesis of diferrocenyldichlorostannane

Diferrocenylmercury (0.20 mole), under an atmosphere of dry nitrogen, was added to a solution of anhydrous stannous chloride (0.30 mole) in 575 ml. of acetone (reagent grade). The mixture was stirred rapidly and refluxed gently on a steam bath under an atmosphere of dry nitrogen for 40 minutes. The mixture was then cooled to room temperature in an ice bath and was filtered through use of a filter-aid. The yellow filtrate was chilled further and the deposited crystals (26.4 grams) were removed by filtration, washed with petroleum ether, and dried in vacuo at 60° C. A second crop of crystals (20.1 grams) was obtained and was treated similarly. The residue obtained by evaporation of the resulting filtrates was extracted with benzene to yield an additional 23.6 grams of diferrocenyldichlorostannane, a total yield of 62.5 percent. The product, after several recrystallizations, had a melting point of 157°–158° C. The molecular weight of the product was 543 whereas the theoretical molecular weight is 559.7. Analysis of the product, in percent, gave: carbon, 43.40; hydrogen, 3.24; iron, 19.48; tin, 21.21; and chlorine, 13.15; the theoretical values are: carbon, 42.92; hydrogen, 3.25; iron, 19.96; tin, 21.21; and chlorine, 12.67.

Example 5.—Synthesis of diferrocenyldiphenylstannane from diferrocenyldichlorostannane Diferrocenyldichlorostannane (0.011 mole) was dissolved in 50 ml. of tetrahydrofuran. The solution was cooled to 0° C. and was maintained under an atmosphere of dry nitrogen. Phenyllithium (0.022 mole), dissolved in a benzene-ether solvent (13.5 ml.), was added slowly from a syringe, with stirring, over a period of 35 minutes. During the latter addition the temperature of the reaction mixture was maintained in the range of 0°–5°. The reaction mixture was then stirred for a period of 2 hours while it was allowed to reach room temperature and then for an additional 4 hours. The mixture was evaporated to dryness on a steam bath. The residue was then extracted with petroleum ether, then with water, then with methanol, and finally with methylene dichloride. The methylene dichloride extract was evaporated to give 3.44 grams of a granular orange solid. The latter was re-extracted with methylene dichloride and filtered through use of a filter-aid. The filtrate was evaporated to yield 2.93 grams of diferrocenyldiphenylstannane, a yield of 43 percent. The recrystallized product (three recrystallizations) had a melting point of 188°–189° C. The molecular weight was found to be 893 whereas the theoretical molecular weight is 643. The analysis, in percent, was found to be: carbon, 59.66; hydrogen, 4.63; iron, 17.00; and tin, 18.82; the calculated values are: carbon, 59.77; hydrogen, 4.40; iron, 17.37; and tin, 18.46. NMR data for diferrocenyldiphenylstannane are given in Table 3.

In the foregoing procedure the insoluble residue in the reaction flask, following the methylene dichloride extraction, weighed 1.81 grams and melted with decomposition and ferrocene sublimation at 271°–273° C. The residue was believed to be polymeric diferrocenyltin.

Example 6.—Synthesis of diferrocenyldiphenylstannane from diphenyldichlorostannane Monolithioferrocene (0.0075 mole) was prepared by the reaction of bromoferrocene and n-butyllithium at 0° C. in a solvent consisting of 125 ml. of tetrahydrofuran and 8.0 ml. of hexane. The monolithioferrocene was not separated from the solvent. Diphenyldichlorostannane (0.0095 mole) was added, with stirring, to the monolithioferrocene solution under an atmosphere of dry nitrogen. The resulting mixture was stirred overnight at room temperature and was then evaporated to dryness. The residue was extracted with benzene and the resulting solution was chromatographed on neutral alumina. Elution with hexane gave 0.15 gram of ferrocene, and subsequent elution with benzene gave 1.45 grams of diferrocenyldiphenylstannane, a yield of 60 percent. After recrystallization the product had a melting point of 188°–189° C. A portion of the product, mixed with the diferrocenyldiphenylstannane made in accordance with the method of Example 5, had an unchanged melting point of 188°–189° C. The infrared spectra of the products of Example 5 and Example 6 were identical.

Example 7.—Synthesis of ferrocenyltriphenylstannane

Monolithioferrocene (0.0057 mole) was prepared in situ as in Example 5. Triphenylchlorostannane (0.007 mole) was added, with stirring, to the monolithioferrocene solution under an atmosphere of dry nitrogen. The mixture was stirred for a period of one hour while the temperature of the mixture was allowed to reach room temperature. The mixture then stood at room temperature overnight. The mixture was evaporated to dryness and the resulting brown-orange residue was extracted with benzene. The benzene solution was chromatographed on neutral alumina. Elution with petroleum ether gave 0.69 gram of a mixture of ferrocene, bromoferrocene and a small percentage of ferrocenyltriphenylstannane. Subsequent elution with benzene gave 2.02 grams of ferrocenyltriphenylstannane, a yield of 71 percent. After recrystallization, the product had a melting point of 163.5°–164° C. The product had a molecular weight of 550.4 whereas the theoretical molecular weight is 535.1. Analysis of the product, in percent, gave: carbon, 63.04; hydrogen, 4.68; iron, 9.63; and tin, 23.74; whereas the theoretical values are: carbon, 62.85; hydrogen, 4.53; iron, 10.44; and tin, 22.18.

NMR data for ferrocenyltriphenylstannane are given in Table 4.

Example 8.—Synthesis of poly(1,1'-ferrocenylenediphenylsilane)

1,1'-dilithioferrocene (0.021 mole) was prepared by the reaction of 1,1'-dibromoferrocene and n-butyllithium at −20° C. and in a solvent consisting of 50 ml. of tetrahydrofuran and 32.5 ml. of hexane. The 1,1'-dilithioferrocene was not separated from the solvent. Diphenyldichlorosilane (0.022 mole) was added rapidly while the temperature of the dilithioferrocene solution was held at 0° C. The mixture was stirred overnight at room temperature. The solvents were then removed by evaporation and the residue was extracted with benzene. The polymer was precipitated in methanol from the benzene solution. The polymer was redissolved in a solvent mixture of 50 ml. of methylene dichloroide and 20 ml. of tetrahydrofuran and was reprecipitated in methanol. The resulting polymer, in 24 percent yield, was soluble in benzene and in methylene dichloride but insoluble in methanol and in hexane. The polymer was obtained as a chocolate brown powder. After two additional reprecipitations of the product, once in hexane and once in methanol, and after drying at 60° in vacuo, the polymer was no longer completely soluble in benzene or methylene dichloride.

The polymer was then split into its soluble and insoluble fractions and these were dried in vacuo at room temperature.

Heating of the soluble polymer to 300° C. (sealed under nitrogen) caused no apparent melting or fusion and there was no sublimation of ferrocene. The residue of this latter treatment, however, was no longer soluble in methylene dichloride, indicating the presence of crosslinks. The soluble polymer had a molecular weight of about 7000 (VPO/benzene).

Heating the soluble polymer to 350° C. under nitrogen caused no melting or fusing and caused no sublimation of ferrocene. Following this treatment the polymer was no longer soluble in methylene dichloride nor benzene, indicating that cross-linking had occurred.

NMR spectra of the polymers showed the expected ratio of phenyl protons to ferrocene ring protons.

Example 9.—Synthesis of poly(1,1'-ferrocenylenedimethylsilane)

1,1'-dilithioferrocene (0.031 mole) was prepared by the reaction of 1,1'-bis(chloromercuri)ferrocene and n-butyllithium at 0° C. in a solvent consisting of 255 ml. of tetrahydrofuran and 129 ml. of hexane. The 1,1'-dilithioferrocene was not separated from the reaction mixture. Dimethyldichlorosilane (0.031 mole) was added, with stirring, from a syringe under an atmosphere of dry nitrogen. During the latter addition and for 45 minutes thereafter, the mixture was held at 0° C. The mixture was then stirred overnight at room temperature. The solvents were then removed by distillation and the residue was steam-distilled to remove di-n-butylmercury and ferrocene. The resulting residue was then extracted with 200 ml. of methylene dichloride which was then evaporated to give a dark brown, viscous oil. The latter was triturated with methanol to give an orange-colored solution and a viscous brown polymer. The polymer was dried in vacuo at 60° C. for one week and then in vacuo at 120° C. to a constant weight. The resulting polymer was a black brittle material weighing 6.0 grams (54 percent yield) and was soluble in benzene and in methylene dichloride but insoluble in methanol. An analysis of the product gave, in percent: carbon, 59.01; hydrogen, 5.64; iron, 22.45; and silicon, 7.42; wheeras the theoretical values for $(C_{12}H_{14}FeSi)_n$ are: carbon, 59.50; hydrogen, 5.84; iron, 23.06; and silicon, 11.60. The molecular weight of the polymer was 1750.

Example 10

Example 9 was repeated except that diphenyldichlorosilane was used as a reactant in place of dimethyldichlorosilane and except that the di-n-butylmercury was not removed by steam distillation. In place of the steam distillation of the crude reaction product followed by extraction of the residue as in Example 9, the solvents were evaporated from the reaction mixture and the residue extracted repeatedly with petroleum ether (1450 ml. in total) and then with methanol. The residue was then extracted with methylene dichloride which was then removed by evaporation and the residue dissolved in benzene. The polymer was reprecipitated in methanol (1.0 liter) and dried in vacuo at room temperature, to give a yield of 39 percent of a chocolate brown powder. The product melted in the range of 120°–140° C. and had a molecular weight of 3380.

Example 11

Example 9 was repeated except that diphenyldichlorostannane was used as a reactant in place of the dimethyldichlorosilane. A yield of 21 percent of polymer was obtained, of which about 2.4 percent was soluble in benzene. This latter soluble portion had a molecular weight of 2370 (VPO/benzene). The insoluble portion of the polymer was characterized by the presence of 48.8 percent mercury.

TABLE 1

[NMR data for diferrocenyldiphenylsilane 9.7% solution in CDCl₃]

| τ, p.p.m. | Description | Relative peak area | Assignment |
|---|---|---|---|
| 7.63 | Multiplet | 10.0 | A |
| 7.39 | do | 10.0 | B and C |
| 4.47 | Triplet | 8.0 | E |
| 4.34 | do | 8.0 | D |
| 3.92 | Singlet | 10.1 | F |

Coupling constants $J_{DE}=J_{ED}=1.6$ cps.

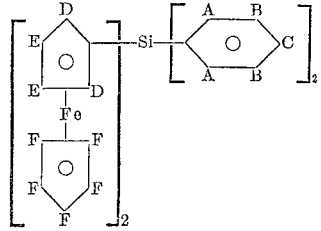

TABLE 2

[NMR data for ferrocenyltriphenylsilane]

| τ, p.p.m. | Description | Relative peak area | Assignment |
|---|---|---|---|
| 7.60 | Multiplet | 15.0 | A |
| 7.39 | do | 15.0 | B |
| 7.41 | do | 8.9 | D |
| 4.21 | do | 8.9 | C |
| 3.93 | Singlet | | E |

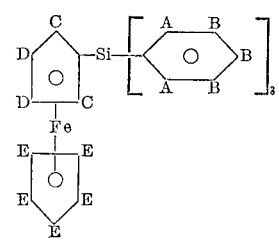

TABLE 3
[NMR data for diferrocenyldiphenylstannane]

| τ, p.p.m. | Description | Relative intensity | Assignment |
|---|---|---|---|
| 2.1–2.8 | Multiplet | 1.1 | A |
| 5.5 | Triplet | 1.0 | B |
| 5.7 | do | | C |
| 6.0 | Singlet | 1.1 | D |

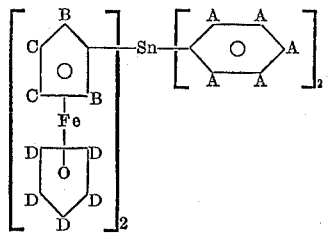

TABLE 4
[NMR data for ferrocenyltriphenylstannane]

| τ, p.p.m. | Description | Relative peak area | Assignment |
|---|---|---|---|
| 7.7 | Multiplet | 15 | A |
| 7.4 | do | 15 | B |
| 4.46 | Triplet | 9.2 | D |
| 4.25 | do | 9.2 | C |
| 4.00 | Singlet | 9.2 | E |

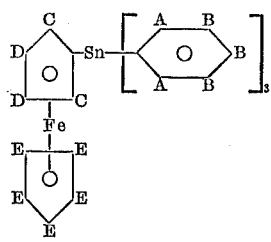

As indicated above, the foregoing compounds have a variety of uses. Probably their most important use is as thermostable ferrocenylene polymers and copolymers. The compounds of the invention and polymers of the type described in Example 8, by way of example, can be subjected to temperatures above 400° C. with little or no apparent decomposition. The silicon-containing compounds are particularly thermostable. The polymers generally are soluble in some organic solvents and can be compounded with additives or other polymer systems for use in coating and adhesive compositions. Many of the compounds, especially compounds such as ferrocenyltri-n-dodecylsilane, make excellent lubricants.

It is to be understood that the foregoing examples and description are for the purposes of illustration only, and that various changes may be made therein without departing from the spirit and scope of the invention.

I claim:
1. A compound having the structure

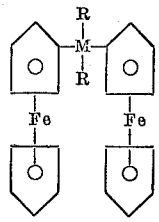

where M is an element selected from the group consisting of Si, Ge, Sn and Pb, and R is a radical selected from the group consisting of halide, alkyl and aryl radicals.
2. The compound of claim 1 where R is a halide radical.
3. The compound of claim 1 where R is an alkyl radical.
4. The compound of claim 1 where R is an aryl radical.
5. Diferrocenyldimethylsilane.
6. Diferrocenyldimethylstannane.
7. Diferrocenyldiphenylsilane.
8. Diferrocenyldiphenylstannane.
9. Diferrocenyldichlorostannane.

References Cited
UNITED STATES PATENTS

| 2,831,880 | 4/1958 | Benkeser | 260—349 |
| 3,060,215 | 10/1962 | Rosenberg et al. | 260—439 |
| 3,350,434 | 10/1967 | Pellegrini et al. | 260—429.7 |
| 1,938,180 | 12/1930 | Groll | 260—11 |

OTHER REFERENCES

Goldberg et al.: J. Org. Chem. 24 (1959) pp. 824–7.
Seyferth et al.: Inorg Chem. 1 (1962) pp. 227–231.

TOBIAS E. LEVOW, Primary Examiner.
A. P. DEMERS, Assistant Examiner.

U.S. Cl. X.R.

106—287; 252—49.7; 260—2, 29.1, 429.7, 437, 439, 448.2